May 26, 1964 R. I. N. WEINGART ETAL 3,134,541

TOTALISATOR

Original Filed Dec. 30, 1953 5 Sheets-Sheet 1

INVENTOR.
RICHARD I. N. WEINGART
& JOSEPH C. WAGNER
BY
Busser, Smith & Harding
ATTORNEYS May 26, 1964 R. I. N. WEINGART ET AL 3,134,541

TOTALISATOR

Original Filed Dec. 30, 1953 5 Sheets-Sheet 2

INVENTOR.
RICHARD I. N. WEINGART
& JOSEPH C. WAGNER
BY
Busser, Smith & Harding
ATTORNEYS May 26, 1964 R. I. N. WEINGART ETAL 3,134,541

TOTALISATOR

Original Filed Dec. 30, 1953 5 Sheets-Sheet 3

INVENTOR.
RICHARD I. N. WEINGART
& JOSEPH C. WAGNER
BY
Busser, Smith & Harding
ATTORNEYS INVENTOR.
RICHARD I. N. WEINGART
& JOSEPH C. WAGNER
BY
Busser, Smith & Harding
ATTORNEYS INVENTOR.
RICHARD I. N. WEINGART
& JOSEPH C. WAGNER
BY
Busser, Smith & Harding
ATTORNEYS

United States Patent Office 3,134,541

Patented May 26, 1964

3,134,541

TOTALISATOR

Richard I. N. Weingart, Windward, Nassau, Bahamas, and Joseph C. Wagner, Bayside, N.Y., assignors to General Register Corporation, Long Island City, N.Y., a corporation of New York Continuation of application Ser. No. 401,212, Dec. 30, 1953. This application Feb. 4, 1960, Ser. No. 6,823
4 Claims. (Cl. 235—91)

This invention relates to a totalisator and has particular reference to means for facilitating the securing of records of tickets sold from totalisators for the various contestants.

This application is a continuation of our application Serial Number 401,212, filed December 30, 1953, now abandoned.

At the present time, totalisators which are located at the various ticket windows of a race track are provided with counters which indicate the numbers of tickets issued from each machine on the various contestants. At the end of each betting period, attendants must circulate to the windows and copy down on sheets the numbers which appear on the totalisator counters and return with the notations thus made to the central accounting station where the numbers are totalled and compared with the totals centrally recorded. It will be evident that this procedure is time-consuming and subject to human error in incorrectly entering a total. Such an error would, of course, throw out the entire matter of the check so as to render it useless.

It is the broad object of the present invention to provide each totalisator with printing counters instead of those which merely exhibit totals, and to provide in association therewith means for effecting printing of the numbers exhibited on the counters so that, with a minimum of effort, a permanent record may be taken of the indications on each totalisator at the close of each betting period. These records may then be assembled to form what amounts to a single sheet so that totals of the tickets issued on various entries may be readily secured.

Additionally, in accordance with the invention, provision is made for resetting the printing counters to zero condition and insurance is provided against subsequent operation of the machine unless zeroizing has been properly effected.

The foregoing and other objects of the invention, particularly relating to details of construction and operation, will become apparent from the following description read in conjunction with the accompanying drawings, in which.

The conventional elements of a totalisator modified in accordance with the invention are not herein illustrated in detail since they will be apparent from consideration of the patent to Webb 2,020,594, dated November 12, 1935. This patent illustrates a totalisator designed to issue tickets printed with the designations of the various contestants in a race. The machine illustrated in said patent is somewhat more elaborate than the usual machines to which it will be assumed the present invention is applied, in that the machine of the patent provides for the issuance of both "win" and "place" tickets. More usually, the machine at a particular race track window will issue tickets of only one class and of one value, and it will be assumed in what follows that a machine of this type is modified in accordance with the invention. Such a machine will generally comprise a single bank of keys carrying the numbers of the race contestants plus, usually, an additional key which may be depressed for testing operation. The Webb patent referred to does not disclose the conventional counters associated with each contestant key, but such counters are provided in actual machines operated by linkages from the several keys.

Figure 3:
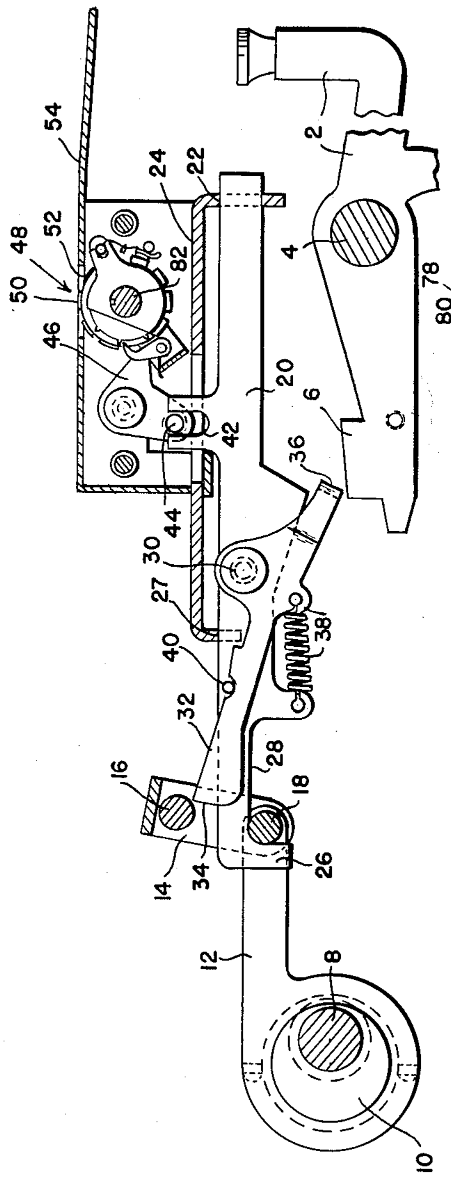
FIGURE 3 is a vertical section taken on the plane indicated at 3—3 in FIGURE 1 and particularly showing various elements involved in the present invention in association with conventional elements of a totalisator.

Reference may be first made to FIGURE 3 which shows in association with conventional elements of a totalisator an arrangement provided in accordance with the present invention for advancing a printing counter one unit upon the issuance of each ticket on the contestant represented thereby. There is indicated at 2 one of the keys of a totalisator ticket issuing machine of the type illustrated in said Webb patent, the keys being mounted on a rod 4. Each key is provided with a ledge 6 at its rear end which is raised when the key is depressed.

A transverse shaft 8 in the totalisator is rotated through a single revolution upon each operation of the totalisator and carries an eccentric 10 which through a strap 12 oscillates a frame 14 about a transverse rod 16 to cause a rod 18 extending transversely across the totalisator to receive a forward and rearward reciprocation during each cycle of operation. The elements just described are illustrated in FIGURE 4*a* of said Webb patent and reference to said patent will disclose the nature of the operative cycle of the shaft. In accordance with the patent, this arrangement is provided to operate total counters and, in the present machine, in addition to serving to secure operation of the individual contestant counters, as will appear hereafter, this arrangement is also used to operate a total counter as will also appear though this total counter is connected differently from those illustrated in the Webb patent.

Corresponding to each contestant key of the totalisator there is a slide 20 which is guided in a slot 22 of a supporting plate 24, the slide 20 being provided at its rear end with a downturned ear 26 extending to the rear of the rod 18 which serves to support the rear end of the slide. The slide is also guided through a slot 27 in a rear flange of the plate 24. Forwardly of the downturned portion 26 of the slide 20 there is the horizontal edge 28 which, with the parts in the condition illustrated in FIGURE 3, would permit the rod 18 to oscillate forwardly without advancing the slide 20.

Pivoted to the slide 20 at 30 there is a lever 32 which is provided with a rear edge 34 which is arranged to move downwardly in front of the rod 18 when the lever 32 is rocked counterclockwise against the action of spring 38 which normally tends to hold it in a position limited by a stop 40 carried by the slide 20. The rocking motion in counterclockwise direction is effected by engagement of the ledge 6 as it moves upwardly with the laterally turned end 36 of the lever 32. When the ledge 6 is thus moved upwardly, and reciprocation of pin 18 takes place, the assembly of the slide 20 and lever 32 is correspondingly oscillated first forwardly and then rearwardly during a cycle of operation, the turned end 36 of lever 32 riding forwardly and then rearwardly on the ledge.

The slide 20 is provided with a slot 42 which embraces a pin 44 on an actuating bell crank 46 for a corresponding printing counter 48 which is supported on the plate 24 and is provided with numeral wheels having printing numerals 50 thereon which project through a slot 52 in a counter cover plate 54 mounted on plate 24. The arrangement is such, the counter being of conventional type, that an advance of one unit occurs upon each depression of a contestant key corresponding to the counter which gives rise to a cycle of operation of the machine and a complete reciprocation of the corresponding slide 20.

Figure 4:
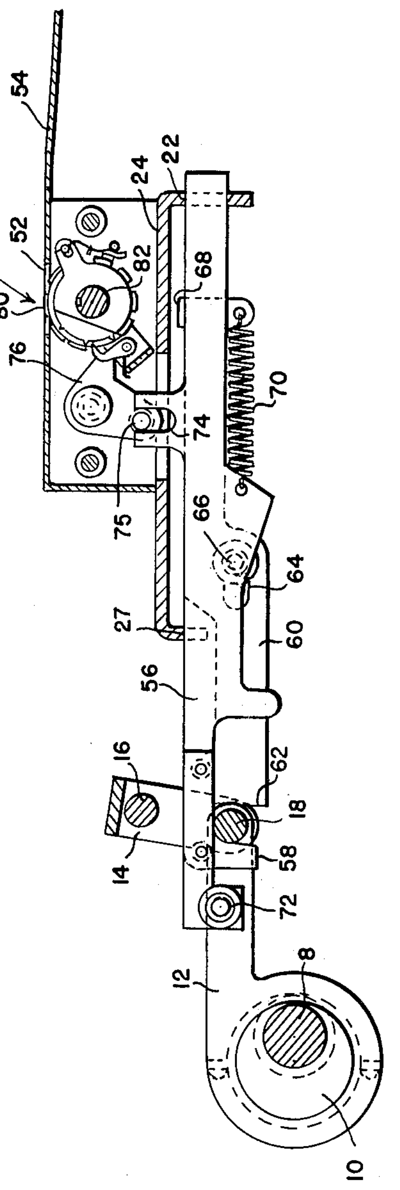
FIGURE 4 is a similar section but taken on the plane indicated at 4—4 in FIGURE 1.

Besides the individual contestant counters 48 there is provided as a check a total counter the operating means for which are illustrated in FIGURE 4. A slide 56 is, like the slides 20, guided in slots 22 and 27 in the frame 24 and is provided with a downturned rear end 58 located behind the rod 18. A slide member 60 is provided with a vertical rear edge 62 located in front of the rod 18 and this member is mounted for sliding movement relative to the slide 56 by being provided with a slot 64 embracing a pin 66 on the slide and by the provision of an ear 68 extending laterally over the upper edge of the slide 56. A spring 70 normally urges the slide member and slide to the relative positions illustrated in FIGURE 4, and for practical purposes with which the invention is concerned the member and slide may be considered essentially as a single slide unit. The reason for the provision of the spring 70 and relative sliding movement permitted thereby is for the purpose of rendering the action of the slide ineffective during test operation of the totalisator involving a restraint on movement of the slide 56 through the medium of connections (not shown) to a pin 72 carried by the slide. Under those conditions, the movement of the rod 18 will effect forward movement of the member 60 without moving the slide 56.

The slide 56 is provided with a slot 74 arranged to embrace a pin 75 carried by the bell crank 76 which operates the total counter 78 which may have the same form as the individual counters previously referred to. The numbers 80 on the counter 78 also project through the slot 52 in the plate 54. Both the individual contestant counters and the total counter having running through them a shaft 82 which by the impartation thereto of a single revolution will serve to zeroize all of the counters. The arrangement for doing this is conventional with counters of this type and need not be described in detail.

Figure 1:
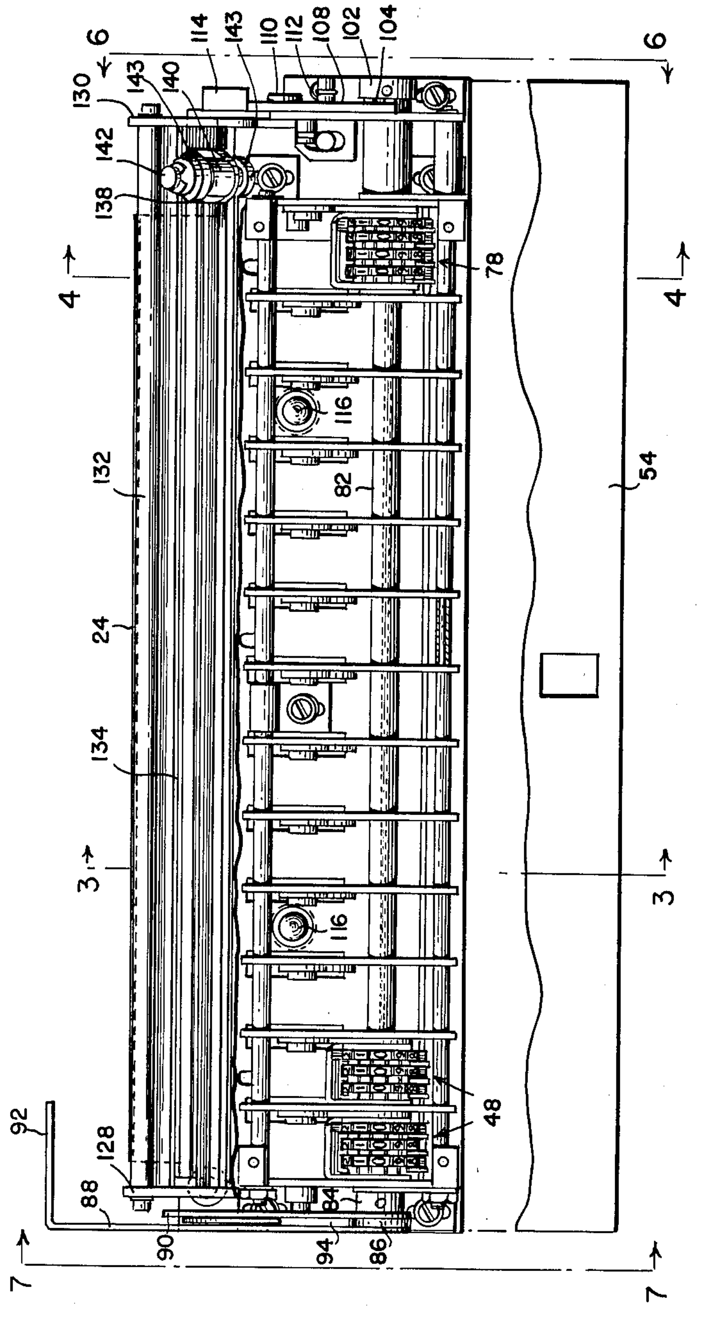
FIGURE 1 is a plan view, with a portion of a cover plate partially broken away, showing the portion of a totalisator provided in accordance with the present invention.

The shaft 82 has secured to the left-hand end thereof, as illustrated in FIGURE 1, a hub 84 for a ratchet 86. Arranged to oscillate with respect to the ratchet and hub is a lever formed of two arms 88 and 90 which are riveted to each other, the arm 88 being provided with a turned end 92 which may be conveniently grasped by an operator to effect zeroizing. A pawl 94 is pivoted between the arms 88 and 90 and is urged by a spring 96 into engagement with the ratchet 86 which is provided with three notches 98 for engagement by the pawl. By imparting three oscillating movements to the levers 88, 90 the shaft 82 may be rotated in the direction of advance of the counters to effect zeroizing of all of the counters 48 and 78. Ears 100 engage plate 24 to serve to locate the levers 88, 90 in a normal inoperative position.

Figure 6:
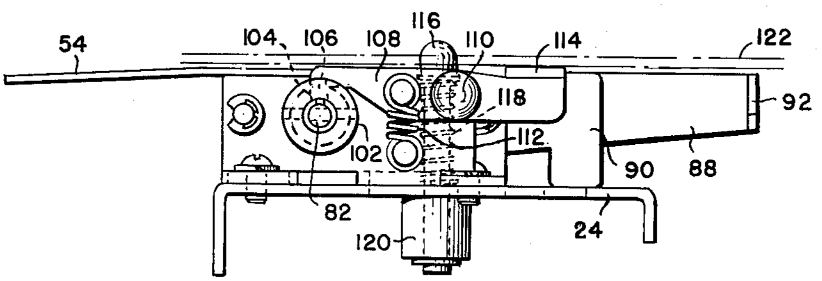
FIGURE 6 is an elevation of the right-hand side of the assembly shown in FIGURE 1 viewed in the direction of the arrows 6—6 therein.
Figure 7:
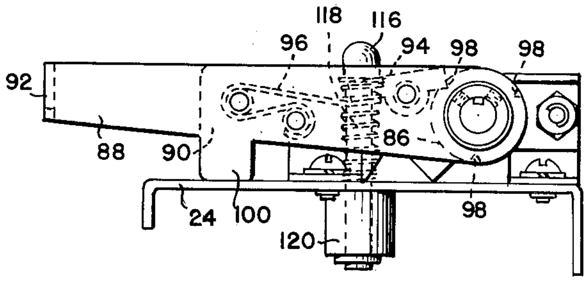
FIGURE 7 is an elevation of the left-hand side of the assembly illustrated in FIGURE 1 viewed in the direction of the arrows 7—7.

At its right-hand end the shaft 82 is provided with a collar 102 which has a slot 104 therein arranged to be engaged by a detent 106 on the forward end of a lever 108 which is pivoted at 110 to the frame and is urged counterclockwse as viewed in FIGURE 6 by a tension spring 112. A finger tab 114 is engageable by an operator's finger to release the detent 106 from slot 104 to permit zeroizing to take place. The shaft 82 is normally held by the detent in the position which it assumes at the end of a zeroizing operation. A pair of pins 116 are spring urged upwardly by springs 118 and are guided for vertical movements in bores in members 120 carried by the plate 24. These pins are arranged to project upwardly through openings in plate 54, the opening being indicated at 124. The pins 116 are yieldingly mounted so as to be depressible by the top cover plate 122 of the machine which is arranged to be locked in closed position during normal totalisator operations. This cover plate 122 is normally located as shown in FIGURE 6, closely overlying or engaging the ends of the lever 108 so that, in particular, the plate 122 cannot be placed in its normal position unless the detent 106 of lever 108 is positioned within the slot 104. Thus, the plate 122 cannot be locked in normal position unless the shaft 82 is in its zeroizing position. The plate 122 is interconnected with locking means for the keys (not shown) so that the keys cannot be depressed unless the plate is in normal position and the counters are properly zeroized.

Pivoted at 126 at both sides of the machine there is a frame consisting of arms 128 and 130 connected by a rod 132 and serving to mount a track 134 which is provided with a slot 136 for the reception of the flat stem of a carrier 138 which supports a roller 140 through the medium of a pin 142. Mounted on the ends of this pin are additional rollers 143 which are arranged to engage the upper surface of the plate 54 at the sides of the opening 52 therein. The upper end of the carrier 138 is provided with an enlarged grip 144 which may be grasped by the fingers of an operator.

Figure 5:
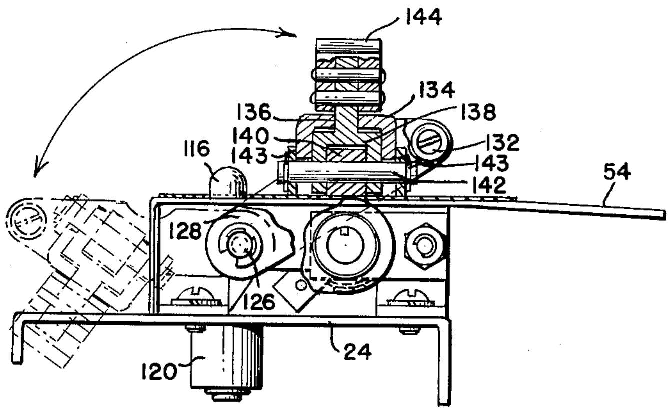
FIGURE 5 is a view partly in section and partly in elevation showing, in particular, the details of the movable roller assembly for effecting printing.

The last described arrangement is such that the assembly comprising the arms 128 and 130 and their associated parts may be swung from the normally inactive position illustrated in construction lines in FIGURE 5 to an operative position illustrated in full lines in that figure whereupon the roller 140 may be caused to traverse the counters to effect printing as will presently appear.

Figure 2:
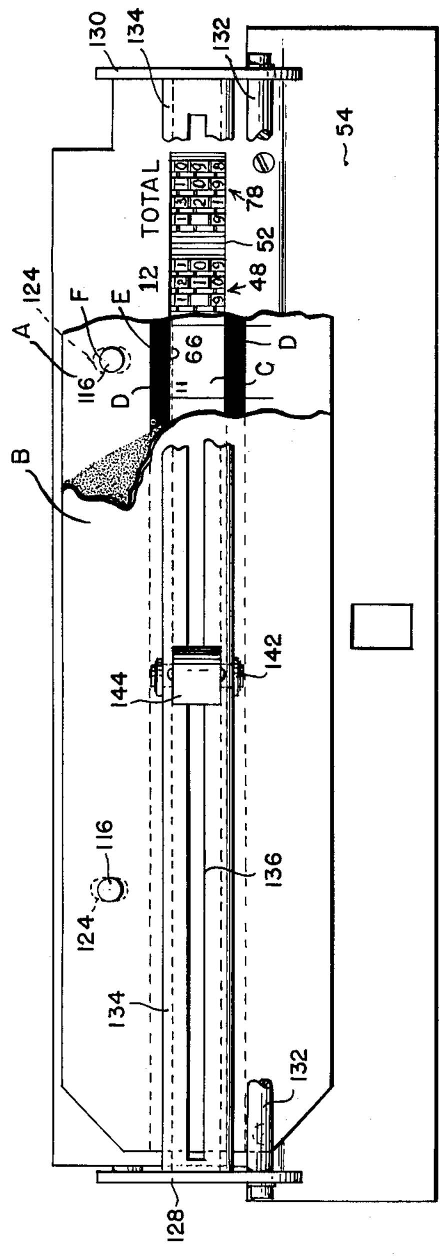
FIGURE 2 is a plan view showing the same matter as FIGURE 1 but with a record strip positioned therein and undergoing printing.
Figure 8:
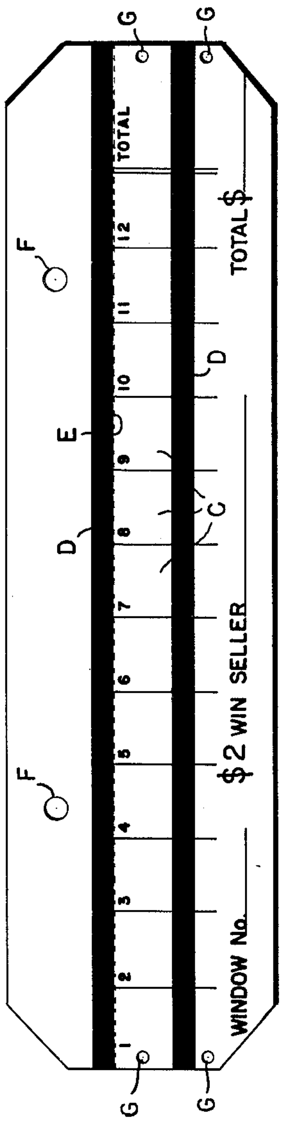
FIGURE 8 is a plan view of a printed record strip as taken from the machine.

For the recording of the totals exhibited by the counters 48 and 78 there are provided paper strip assemblies the nature of which will be evident from consideration of FIGURES 2 and 8. One or more sheets A are assembled in a unit with an upper sheet B of carbon paper carrying its carbon on its lower surface adjacent to the upper surface of the top sheet A. It will be evident that a number of copies of the record may be provided by the stacking of a plurality of sheets A with all except the lowermost having carbon on their lower sides. These sheets A may all have the same construction and preprinted areas thereon and it will suffice in the following description to consider only one of them. Each of these sheets is provided with areas C which correspond to the individual contestant counters and the total counter. Above and below these areas there are desirably printed heavy black lines indicated at D, the sole purpose of these being to avoid unsightly smudging by the action of the rollers 143 as will appear hereafter. A line of perforations E may be provided above the areas C for the purpose of tearing apart the upper and lower portions of the strip. Holes F are provided in the sheets A and in the carbon sheet B for the reception of the pins 116, the insertion of the sheets on these pins serving to locate them in proper position for the printing of the counter records. Holes G are provided in the sheets for the purpose of later mounting them on a board as will appear hereafter.

The operation of what has been so far described may be outlined as follows:

At the beginning of a ticket selling period, the counters will have been zeroized and the parts will occupy the positions illustrated in the several figures, with the roller assembly in the position illustrated in construction lines in FIGURE 5. The cover plate 122 will be then locked in position.

The issuance of tickets will then take place in conventional fashion and as each ticket is issued the corresponding counter 48 will be advanced one unit and the total counter 78 will also be advanced one unit. These operations take place as previously described through the medium of the mechanisms particularly illustrated in FIGURES 3 and 4.

At the close of the betting period, authorized persons will go to the ticket issuing windows to secure the records of the totals exhibited in the machines. This person will unlock and lift the cover plate 122 of each machine, exposing the counters and plate 54. A record sheet assembly will then be located on the pins 116 which will move upwardly as the cover plate 122 is lifted. The roller assembly is then moved to the position illustrated in full lines in FIGURE 5 and the roller 140 is caused to traverse the counters, pressing the carbon sheet B and the sheets A against the counters to secure printing in the areas C of the numbers which appear on the counters. The individual contestant totals and the grand total are thus recorded. The relative arrangement of the roller 140 and the rollers 143 is such that where the numbers are presented the roller 140 applies pressure and the rollers 143 do not do so. However, between the counters where the roller 140 would tend to drop downwardly and produce smudging, the rollers 143 limit downward movement so that a clean result is secured. The rollers 143 will produce smudging in the black printed areas D but such smudging will not show because of this printing. Following the making of the record as just described, the roller assembly may be moved to its inoperative position and the counters may be zeroized by imparting the necessary upward and forward movements to the lever 88, 90, the lever 108 being moved to release its detent 106 from the slot 104 to permit initial movement of the shaft 82. When zeroizing is completed, the detent will drop into the slot, arresting the shaft 82. The cover plate 122 may then be relocated in position and locked. It will be noted that the cover plate cannot be so positioned unless the zeroizing has been completed. The totalisator is then in condition for issuing tickets for a next race.

Figure 9:
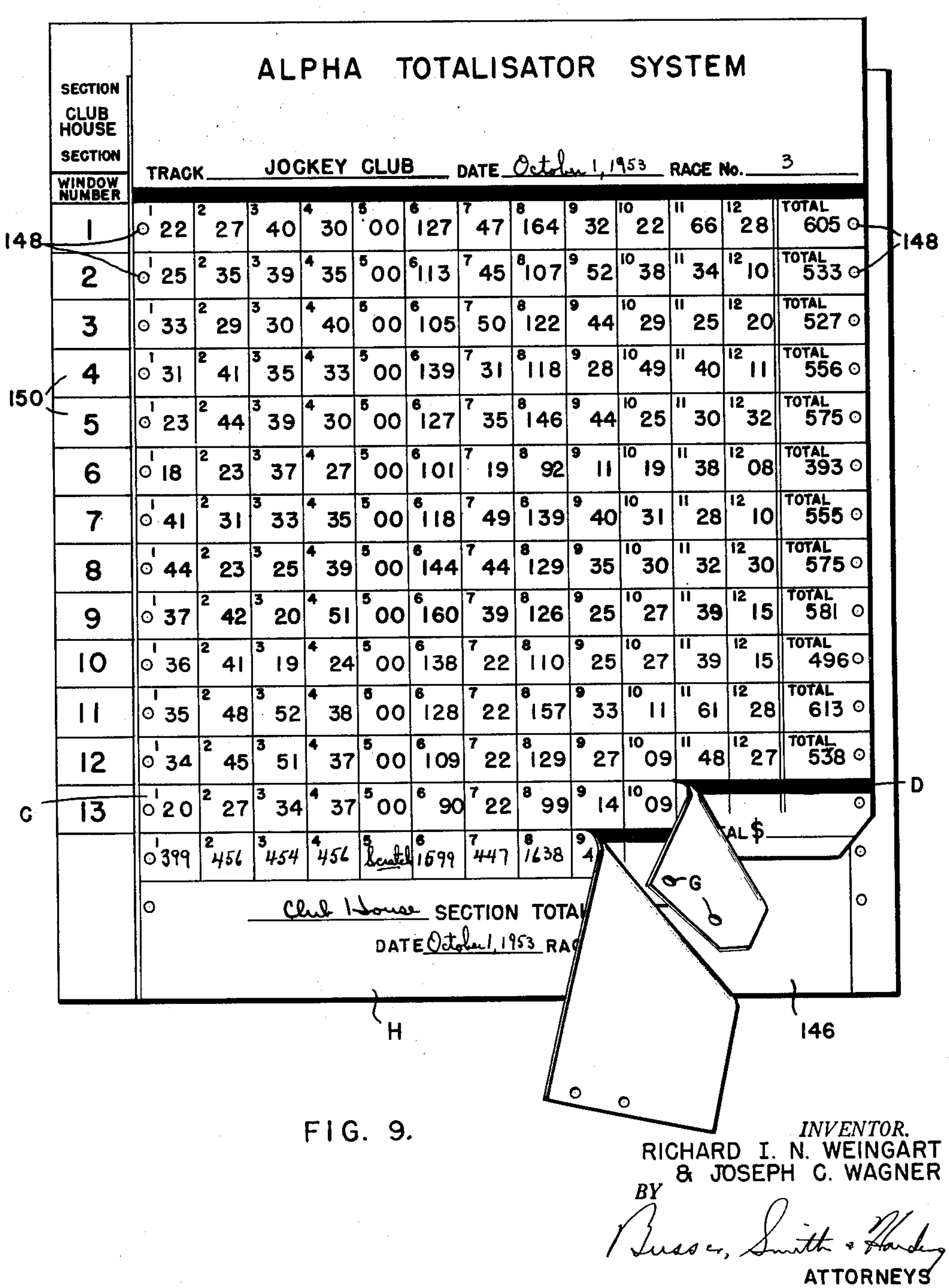
FIGURE 9 is a plan view of the assembly of record strips with a supporting board to illustrate how there may be secured the totals of tickets issued on various contestants.

The record strips A which have been removed from the machines may then have their upper portions torn off along the perforation lines E and discarded. They are then conveniently assembled on a board 146 provided with pins 148 for the reception of the holes G and by placing the strips A on the board in overlapping relationship, as indicated in FIGURE 9, the areas corresponding to the various contestants will be arranged in vertical alignment so as to be readily susceptible to totalling. The board may contain preliminarily various legends as, for example, the window numbers 150 opposite which the entries relating to the windows are located. If desired, a strip H may be located at the bottom of the assembly for the reception of written-in totals and other written notations concerning the operations recorded. In strips of transparent sensitive adhesive type are adhered to the assembled strips they may be kept assembled after removal from the board for a permanent record.

It will be evident that various arrangements other than that specifically illustrated may be adopted embodying the principles of the invention. For example, instead of removing a cover plate such as 122, there may be provided in the machine a slot into which the record strips may be entered. A pressure roller may be drawn across the strips to press them into contact with the counters through manual pulling of a plunger or through the operation of some other convenient device.

It will be evident that the invention may be applied to various race ticket issuing machines including not only the totalisators of the type described but machines for issuing Daily Double, Quinella, or other tickets.

What is claimed is:

1. A ticket issuing machine comprising a plurality of keys, each controlling the issuance of a ticket of an individual type, a plurality of counters individually associated with corresponding keys to register the number of tickets issued upon operation of its key, drive means movable during each operation of the machine, means controlled by each key coupling its corresponding counter to said drive means to effect advance of its corresponding counter by said drive means to register the issuance of a ticket, said counter being provided with type numerals, means for locating a record sheet in predetermined printing position relative to all of said counters and for insertion into and removal from said position from the exterior of the machine, and manually controlled means for effecting printing of said record sheet by the type of said counters independently of a ticket issuing operation.

2. A ticket issuing machine comprising a plurality of keys, each controlling the issuance of a ticket of an individual type, a plurality of counters individually associated with corresponding keys to register the number of tickets issued upon operation of its key, drive means movable through a definite cycle during each operation of the machine, means controlled by each key coupling its corresponding counter to said drive means to effect advance of its corresponding counter by said drive means to register the issuance of a ticket, a counter registering the total number of tickets of all of the types issued, means coupling the last mentioned counter to said drive means, said counters being provided with type numerals, means for locating a record sheet, in predetermined printing position relative to all of said counters and for insertion into and removal from said position from the exterior of the machine, and manually controlled means for effecting printing of said record sheet by the type of said counters independently of a ticket issuing operation.

3. A ticket issuing machine comprising a plurality of keys, each controlling the issuance of a ticket of an individual type, a plurality of counters individually associated with corresponding keys to register the number of tickets issued upon operation of its key, drive means movable during each operation of the machine, means controlled by each key coupling its corresponding counter to said drive means to effect advance of its corresponding counter by said drive means to register the issuance of a ticket, said counter being provided with type numerals, means for locating a record sheet, in predetermined printing position relative to all of said counters and for insertion into and removal from said position from the exterior of the machine, and manually controlled means for effecting printing of said record sheet by the type of said counters independently of a ticket issuing operation, said counters being arranged in a linear series, and said means for manually effecting printing comprising a member mounted on the machine and movable across said series of counters for pressing the record sheet successively against the counters, and a guide for mounting and guiding said movable member across said series of counters.

4. A ticket issuing machine comprising a plurality of keys, each controlling the issuance of a ticket of an individual type, a plurality of counters individually associated with corresponding keys to register the number of tickets issued upon operation of its key, drive means movable through a definite cycle during each operation of the machine, means controlled by each key coupling its corresponding counter to said drive means to effect advance of its corresponding counter by said drive means to register the issuance of a ticket, said counter being provided with type numerals, means for locating a record sheet in predetermined printing position relative to all of said counters and for insertion into and removal from said position from the exterior of the machine, and manually controlled means for effecting printing of said record sheet by the type of said counters independently of a ticket issuing operation, said counters being arranged in a linear series, and said means for manually effecting printing comprising a member mounted on the machine and movable across said series of counters for pressing the record sheet successively against the counters, and a guide for mounting and guiding said movable member across said series of counters, said guide and member mounted thereon being swingable between an active position in which said guide is above said counters and an inactive position in which the guide is remote from said counters to permit visual reading thereof.

References Cited in the file of this patent

UNITED STATES PATENTS

| | | |
|---|---|---|
| 676,456 | Bolfing | June 18, 1901 |
| 994,132 | Dana | June 6, 1911 |
| 1,990,304 | Mulford et al. | Feb. 5, 1935 |
| 2,020,272 | Woodford | Nov. 5, 1935 |
| 2,378,708 | Keen et al. | June 19, 1945 |
| 2,675,963 | Keen et al. | Apr. 20, 1954 |